United States Patent [19]

Attig

[11] 3,998,613
[45] Dec. 21, 1976

[54] APPARATUS FOR REMOVING SULFUR DIOXIDE AND PARTICULATE MATTER FROM FLUE GASES

[76] Inventor: Donald B. Attig, P.O. Box 50, Pontiac, Ill. 61764

[22] Filed: Oct. 29, 1974

[21] Appl. No.: 518,706

[52] U.S. Cl. .................................. 55/256; 55/222; 261/17; 261/121 R; 261/125; 261/158; 261/DIG. 9; 110/119

[51] Int. Cl.² ........................................ B01D 47/02

[58] Field of Search ............ 55/222, 225, 244, 255, 55/256, 467, DIG. 30, 245, 410; 261/121 R, 122, 123, 125, 17, 158, DIG. 9; 110/119; 60/310

[56] References Cited
UNITED STATES PATENTS

| 94,611 | 9/1869 | Kaiser | 261/125 |
|---|---|---|---|
| 1,032,536 | 7/1912 | Gerli et al. | 55/256 X |
| 1,677,502 | 7/1928 | Sweetland | 261/121 R |
| 1,782,890 | 11/1930 | Elliott et al. | 55/222 X |
| 1,790,507 | 1/1931 | Most | 261/121 R |
| 2,409,558 | 10/1946 | Gonn | 55/225 X |
| 2,612,745 | 10/1952 | Vecchio | 55/222 X |
| 3,224,170 | 12/1965 | Iwanaga et al. | 55/256 |
| 3,520,113 | 7/1970 | Stokes | 55/256 X |
| 3,678,657 | 7/1972 | Hale | 55/222 |

Primary Examiner—Frank W. Lutter
Assistant Examiner—David L. Lacey
Attorney, Agent, or Firm—Tilton, Fallon, Lungmus, Chestnut & Hill

[57] ABSTRACT

An apparatus for the removal of sulfur dioxide and particulate matter from flue gases wherein a pump extracts hot flue gases from a furnace and discharges such gases, and the particulates entrained therein, into one end of an extractor comprising a horizontal series of water-containing extraction chambers. The gas under pressure is forced from one chamber to the next through communicating openings in the lower side walls of the chambers, the gas pressure being sufficient to displace some of the water and maintain at least the final chamber in substantially filled condition. The water in the series of extraction chambers combines with the sulfur dioxide in the circuitously-flowing flue gases to produce an acid solution, thereby extracting the sulfur dioxide and simultaneously washing particulates from the gases. A suitable heat exchanger is disposed in at least one of the chambers for transferring heat from the water to a fluid circulated through the exchanger.

11 Claims, 8 Drawing Figures

APPARATUS FOR REMOVING SULFUR DIOXIDE AND PARTICULATE MATTER FROM FLUE GASES

Background and Summary

Improved methods and devices are continually being sought for removing pollutants from the exhaust gases of combustion equipment but, despite such efforts, simpler and more effective means are still needed for extracting sulfur dioxide and particulates from the gases discharged from furnaces and other equipment which burn fossil fuel, especially coal having a relatively high sulfur content. U.S. Pat. Nos. 3,710,548, 2,150,027, 700,850, 2,785,879, 2,797,768, 3,032,968, 3,144,198, 3,169,524, 3,520,113, 3,665,681, 3,729,901, 3,584,607, 3,783,839, and 3,608,660 are illustrative of the prior art.

An important aspect of this invention lies in providing an improved system for extracting sulfur dioxide and particulate matter from combustion gases, particularly the flue gases of coal-burning furnaces and other coal-burning equipment. One or more positive acting pumps are utilized to create a forced draft and to direct the combustion gases through a horizontal series of extration chambers. The gases tend to rise in the body of water contained in the first chamber but are able to escape into a second chamber only through a communicating opening located near the lower end of the respective chambers. Pressures sufficient to force the gases downwardly into the next chamber also produce considerable turbulence, intimately mixing or scrubbing the gases with the water in the chambers. The process is continued through the series of chambers, each time the gases being redirected downwardly in order to escape from one extraction chamber to the next and each time being intimately contacted with the water to further increase the cleansing action. The cleansed gases finally pass into a discharge conduit having an enlarged outlet chamber portion and are then either released to atmosphere or used in the operation of industrial equipment.

The flue gases are introduced into the system with sufficient pressure to cause liquid displacement from one chamber to the next, the final extraction chamber in the series being maintained full of liquid during normal operation. The operation is facilitated by connecting a suitable blower to the discharge conduit to maintain the desired fluid levels throughout the battery of extraction chambers. The outlet chamber portion of the discharge conduit projects upwardly from the top wall of the final extraction chamber and the pressure of the flue gases passing through the system causes the liquid to maintain a level in the outlet chamber substantially above the top of the final extraction chamber.

In one form of the invention, one or more of the extraction chambers is provided with a plurality of vertical partitions dividing that chamber into a horizontal series of flow cells which communicate with each other adjacent their lower ends. The chamber is thus subdivided into a multiplicity of smaller extraction chambers or cells in each of which the flue gases tend to rise but are redirected downwardly under pressure to pass from one cell to the next.

Other objects and advantages of the invention will become more apparent as the specification proceeds.

DRAWINGS

DESCRIPTION

Figure 1:
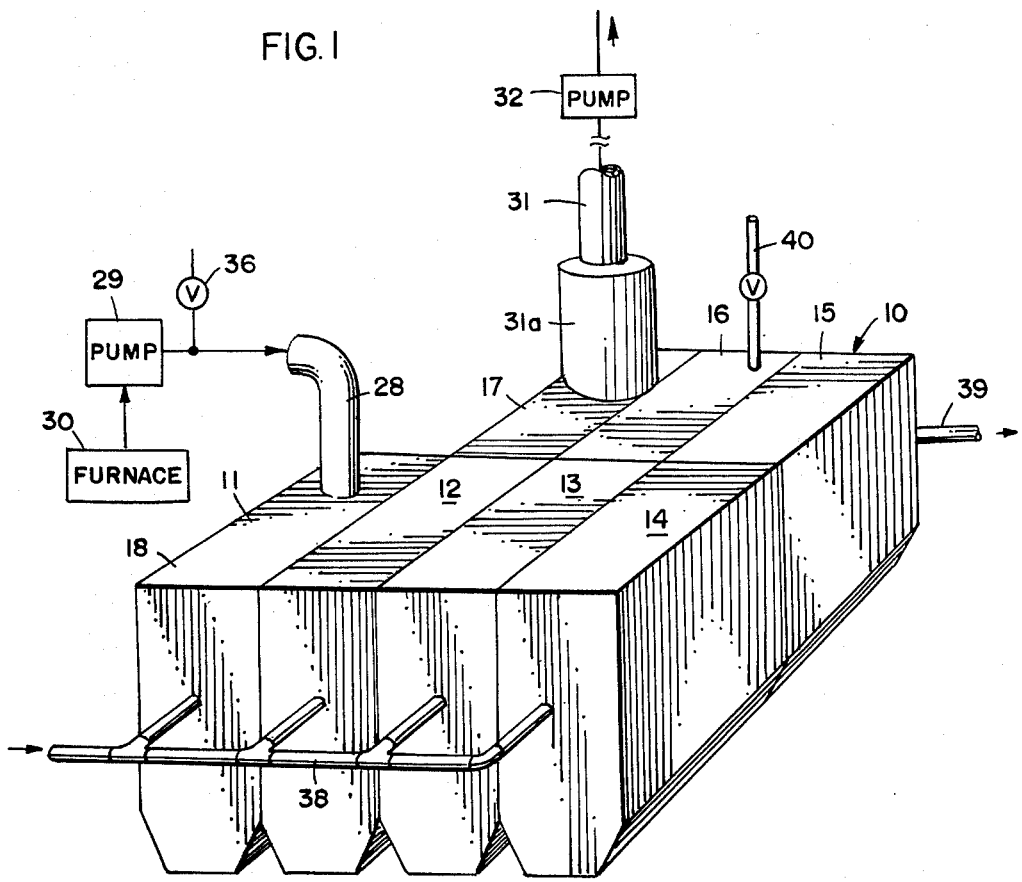
FIG. 1 is a perspective view of an extractor comprising a series of interconnected extraction chambers, certain elements of the system being illustrated in diagrammatic fashion.
Figure 3:
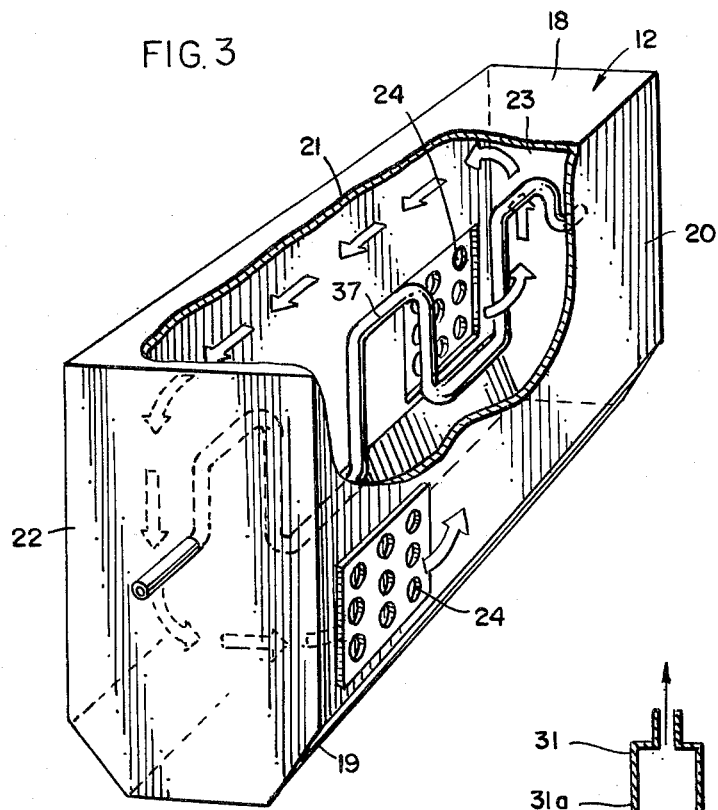
FIG. 3 is a perspective view illustrating details of construction of a single extraction chamber.

In the embodiment illustrated in FIG. 1, the numeral 10 generally designates an extractor comprising a horizontal series of extraction chambers 11–17. While seven such chambers are shown, it is to be understood that a greater or smaller number might be provided. The series comprises an initial or first chamber 11, a final or last chamber 17, and a plurality of intermediate chambers 12–16. FIG. 3 depicts intermediate chamber 12 as a typical chamber having top wall 18, bottom wall 19, and side walls 20-23. As shown, a pair of the opposing side walls 20, 21 are horizontally elongated and are provided at opposite lower ends with openings 24. Except for such openings, each of the intermediate chambers is completely sealed.

Each side wall 20 and 21 may be provided with only a single lower opening 24 although preferably a multiplicity of such openings are provided as shown. If desired, such openings may be formed in a plate 25 which is then secured to the walls of adjacent chambers, being fitted over relatively large openings 26 formed in the contiguous walls. Gaskets 27 or other appropriate sealing means may be used to insure an effective fluid-tight seal between the parts. Thus, plate 25 subdivides the communicating openings 26 into a multiplity of smaller openings 24 to reduce the size of gas bubbles passing from one chamber to the next during a treatment operation.

Figure 2:
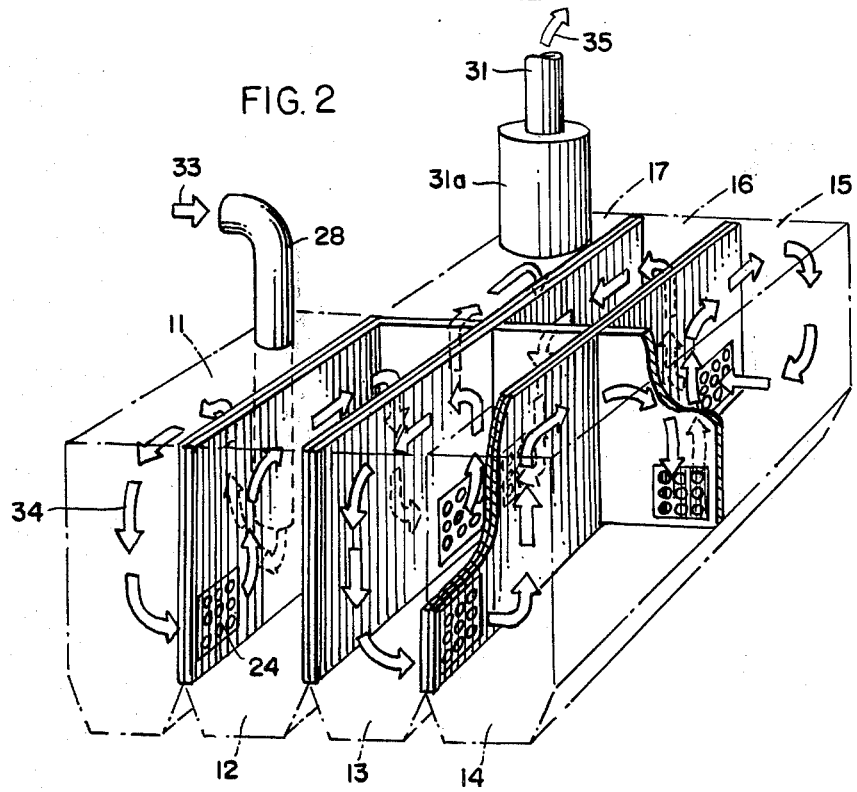
FIG. 2 is a perspective view illustrating the extractor in the same orientation as in FIG. 1 but showing certain walls of the chambers in phantom to reveal the internal arrangement and flow pattern.

As illustrated most clearly in FIGS. 1 and 2, an inlet conduit 28 extends downwardly into chamber 11 through the top wall 18 thereof, the lower end of the conduit being disposed near the bottom of the chamber and at a substantial horizontal distance from the opening or openings 24 for the escape of gases from that chamber (FIG. 2). The conduit 28 is in direct communication with a pump 29 which in turn communicates with a furnace 30. It is to be understood that the furnace may be part of a boiler assembly and that such furnace is adapted to burn fossil fuel, particularly coal having a relatively high sulfur content. Under such circumstances, and as well understood in the art, the hot combustion gases from furnace 30 therefore contains substantial amounts of sulfur dioxide.

In the illustration given, the last or final chamber of the series, chamber 17, is provided with a gas discharge conduit 31 which has an enlarged outlet chamber portion 31a disposed above the top wall of chamber 17. A tubular partition 31b communicates with the outlet chamber portion and extends downwardly into the final extraction chamber, terminating near the bottom of that chamber. Outlet chamber portion 31a is depicted as having substantial capacity, preferably 30 percent or more of the total volume of the final extraction chamber disposed therebelow. The discharge conduit 31 may exhaust to atmosphere or may lead to any suitable equipment capable of utilizing the cleansed gases discharged from such conduit. As shown in FIG. 1, the conduit communicates with suction means in the form of a pump or blower 32 for drawing such gases from chamber 17.

FIGS. 2–5 illustrate the pattern of air flow through the interconnected chambers of the extractor. Flue gases enter the inlet conduit 28 as indicated by arrows 33 and are discharged into the water contained in that chamber, the discharge taking place near the chamber's lower end. The hot gases tend to rise within that chamber but are redirected downwardly through opening or openings 24 at the opposite end of the horizontally elongated chamber because of the substantial pressure developed by pumping means 29 and 32. Consequently, the gases entering chamber 11 tend to rise, traverse the length of the chamber, and then descend as indicated by arrows 34. Upon entering chamber 12, the gases follow a similar flow pattern rising, then traversing, and then descending to enter the next chamber 13 and each succeeding chamber 14–17. Finally, the cleansed gases are discharged from the last chamber 17 as indicated by arrows 35.

Figure 5:
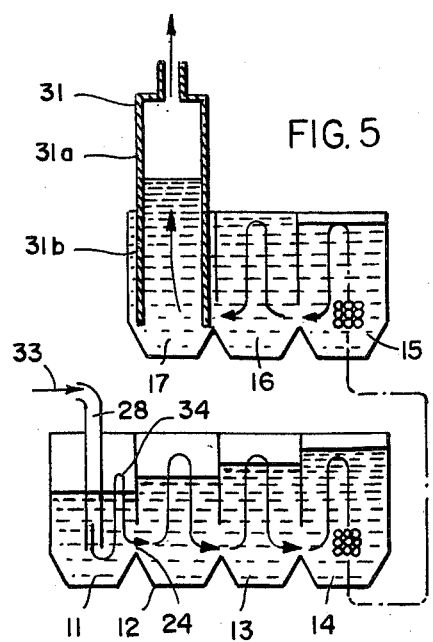
FIG. 5 is a somewhat schematic view showing the flow pattern and liquid levels in the chambers of the interconnected series.
Figure 6:
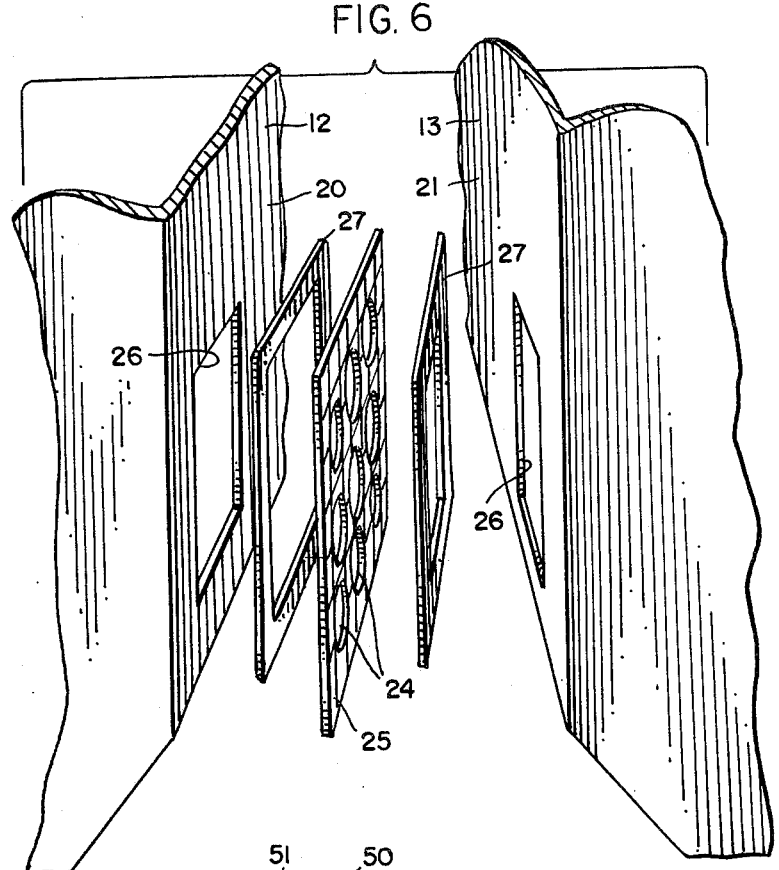
FIG. 6 is a fragmentary exploded perspective view showing the communicating interrelationship between successive chambers of the series.

For clarity of illustration, the flow pattern of the gases has been illustrated in the drawings as consisting of a rising, traversing, and descending pattern in each chamber. In actual practice, considerable turbulence is caused by the competing forces, with some bubbles rising and others descending in close proximity, although the ultimate effect is as shown. Pressurization of the chambers arising primarily from operation of the pumping means 32, preferably supplemented by pumping means 29, results in the flow of gases from one chamber to the next. Such pressurization also results in some displacement of the cleansing liquid (water) as schematically illustrated in FIG. 5. It is important that the pressure exerted upon the flue gases be sufficient to drive those gases through the entire series of chambers and that for completeness of operation such pressure be sufficient to cause the liquid in final chamber 17, and preferably in other chambers as well, to reach the top wall 18, thereby substantially filling such chambers. In the best mode known for practicing the invention, the pressure is sufficient to cause the liquid in the outlet chamber portion 31a of discharge conduit 31 to reach a level which is substantially above the top of chamber 17, thereby insuring that the final chamber is substantially completely filled with liquid during operation of the apparatus (FIG. 5). To avoid excessive pressures within the extractor, and also to prevent possible dangers of furnace explosion should the passages or openings of the extractor somehow become clogged, a suitable relief valve 36 may be connected to the line leading from pump 29 to conduit 28 (FIG. 1).

Heat transferred from the flue gases to the water contained in the extractor chambers may be drawn from the extractor by circulating a suitable fluid (such as water) through heat exchangers disposed in one or more of the chambers. Referring to FIG. 3, it will be observed that the heat exchanger 37 consists of a coil or non-linear configuration of tubing formed of a thermally-conductive material. Manifolds 38 and 39 (FIG. 1) deliver and carry off the fluid passing through the exchangers, such fluid being circulated by suitable pumping means (not shown) and being circulated through radiators or other heat exchanging means (not shown) to transmit the absorbed heat to appropriate enclosures or equipment.

Figure 4:
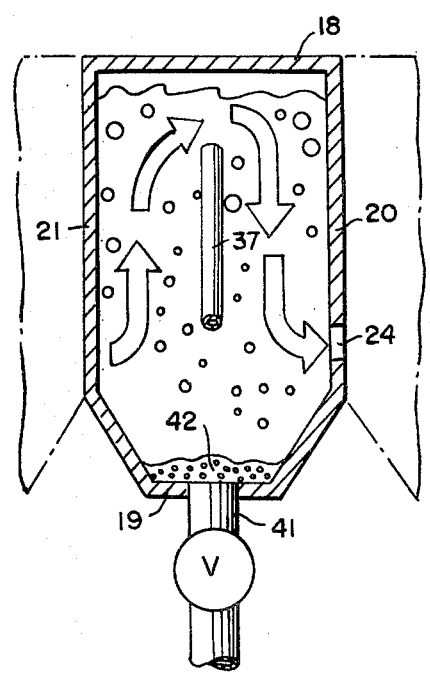
FIG. 4 is a vertical transverse sectional view of such a chamber.

Water lost through evaporation during operation of the system may be replenished by fresh water from any suitable source of supply introduced into the interconnected chambers by valve-equipped line 40 (FIG. 1). Periodic draining of the extractor is possible through discharge conduits 41 which communicate with the respective chambers throught the bottom walls 19 thereof (FIG. 4). Particulate matter 42 settling to the bottom of each chamber may also be extracted through passage 41. It is to be understood that the valves of lines 40 and 41 may either be manually or automatically operated to control the draining or refilling of the chambers, and that such procedures would be undertaken when the acid concentration and/or the accumulation of particulates within such chambers reach predetermined levels.

Figure 7:
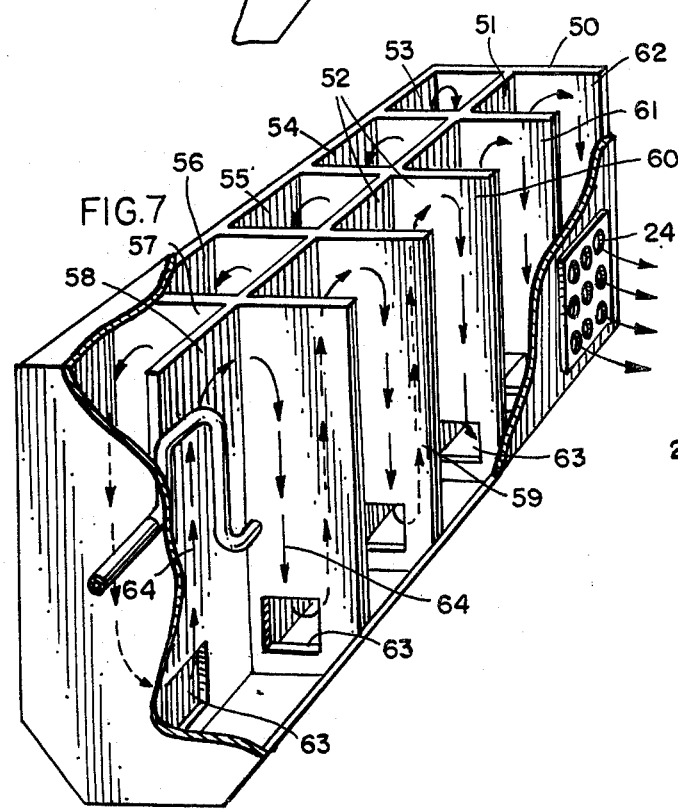
FIG. 7 is a perspective view of a modified extraction chamber subdivided to provide a plurality of flow cells.
Figure 8:
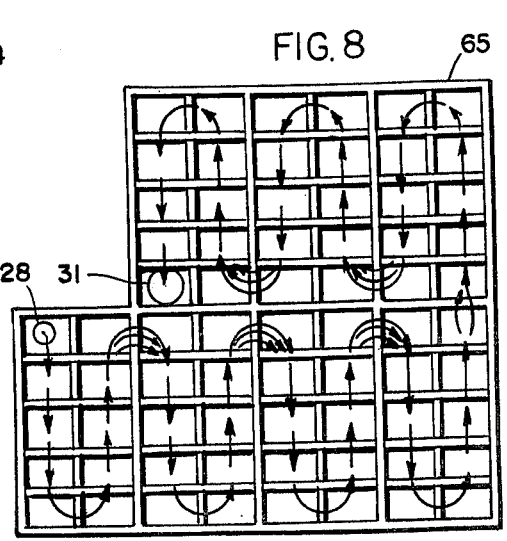
FIG. 8 is a schematic top view showing the interconnection of a plurality of extraction chambers of the type illustrated in FIG. 7.

FIGS. 7 and 8 illustrate a modification of the apparatus in which one or more of the chambers is subdivided into a plurality of flow cells. FIG. 7 depicts a chamber 50 which is substantially the same as the chambers already described except that a plurality of vertical longitudinal partitions 51 and vertical transverse partitions 52 divide the chamber into a series of flow cells 53–62 which communicate with each other through lower apertures 63. Gas enters the chamber through side wall openings 24 at the lower end of the first cell 53 and, after passing through the cells in the manner generally represented by arrows 64 in FIG. 7, is discharged through side wall openings 24 communicating with cell 62. If the partitioned chambers were arranged in the general pattern previously described and shown in FIGS. 1–2, then the flow through such chambers and their multiple flow cells would be as depicted in FIG. 8. The entire extractor 65 schematically illustrated in FIG. 8 is substantially identical to extractor 10 except for the partitioning of the chambers and the relocation of certain openings 24 and the relocation of conduits 28 and 31 to permit series flow through the interconnected chambers and their cells. It will be observed that each cell functions as a miniature chamber and that the flow of gas in that cell follows a similar pattern as already described in connection with the operation of extractor 10. Thus, gas enters a cell through a lower aperture 63 and tends to rise as indicated by arrows 64 (FIG. 7). The pressure upon the gas produces considerable turbulence in each of the cells, however, and the gas, in order to escape from one cell to the next, must descend and pass through a second lower aperture 63 which communicates with the next cell in the series.

While in the foregoing I have disclosed an embodiment of the invention in considerable detail for purposes of illustration, it will be understood by those skilled in the art that many of these details may be varied without departing from the spirit and scope of the invention.

I claim:

1. An apparatus for extracting sulfur dioxide and particulate matter from hot flue gases, comprising a first chamber, final chamber, and plurality of intermediate chambers arranged in horizontal series; each of said chambers having top, bottom, and side walls; said first chamber being provided with gas inlet means and said final chamber being provided with gas outlet means; passage means providing flow communication between said chambers of said series; said passage means including an opening through a lower portion of a side wall of said first chamber, an opening through a lower portion of a side wall of said final chamber, and two horizontally-spaced openings through lower portions of those side walls of each of said intermediate chambers adjacent the preceding and succeeding chambers of said series; said chambers communicating with the preceding and succeeding chambers of said series only through said openings; whereby, gas flowing through each intermediate chamber must enter through one of said spaced openings and exit at a horizontal distance therefrom through the other of said openings; pumping means connected to said outlet means for drawing flue gases under pressure through said chambers from said inlet means through said outlet means; each of said chambers containing a substantial volume of water and said pumping means being capable of drawing flue gases through said chambers under sufficient pressure to displace an amount of water from one chamber to the next in said series and to maintain said final chamber substantially filled with water.

2. The apparatus of claim 1 in which said gas outlet means includes a gas discharge conduit extending upwardly through the top wall of said final chamber, said pumping means being capable of drawing said flue gases with sufficient pressure to maintain a water level within said discharge conduit above the top of said final chamber during normal operation.

3. The apparatus of claim 2 in which said conduit includes an enlarged outlet chamber portion disposed above said final chamber, said outlet chamber portion having a capacity of at least 30 percent of the capacity of said final chamber.

4. The apparatus of claim 3 in which said final chamber includes a tubular partition having an upper end communicating with said outlet chamber and a lower end disposed adjacent the bottom of said final chamber.

5. The apparatus of claim 1 in which each of said openings of said passage means is subdivided to provide a multiplicity of closely-spaced smaller openings extending between successive chambers of said series.

6. The apparatus of claim 5 in which said passage means includes plates disposed between adjacent chambers and sealed thereto, said multiplicity of said openings being formed in each of said plates.

7. The apparatus of claim 1 in which said gas inlet means includes a gas inlet conduit extending into said first chamber and having a discharge opening adjacent the lower end of said first chamber.

8. The apparatus of claim 1 in which pumping means is also connected to said inlet means for forcing flue gases under pressure through said chambers.

9. The apparatus of claim 1 in which at least one of said chambers is provided with a plurality of vertical partitions dividing the said one chamber into a horizontal series of flow cells, said series extending along the horizontal path of flow of gases through said chamber and at least certain of said partitions extending transversely to said path of flow, all of said transversely-extending partitions being apertured at their lower ends for the passage of flue gases through said series of cells.

10. The apparatus of claim 9 in which a plurality of said chambers are provided with said partitions.

11. The apparatus of claim 1 wherein the horizontally spaced openings in the lower side wall portions of each intermediate chamber are disposed adjacent opposite ends of each such chamber.

* * * * *